United States Patent
Lim et al.

(10) Patent No.: US 11,073,447 B2
(45) Date of Patent: Jul. 27, 2021

(54) APPARATUS AND METHODS FOR TRANSFERRING A TISSUE SECTION

(71) Applicant: Agilent Technologies, Inc., Santa Clara, CA (US)

(72) Inventors: Victor Lim, Pacifica, CA (US); Kyle Schleifer, Somerville, MA (US); Russ Klein, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 153 days.

(21) Appl. No.: 15/445,585

(22) Filed: Feb. 28, 2017

(65) Prior Publication Data

US 2017/0284904 A1 Oct. 5, 2017

Related U.S. Application Data

(60) Provisional application No. 62/316,192, filed on Mar. 31, 2016.

(51) Int. Cl.
*G01N 1/06* (2006.01)
*H05F 3/04* (2006.01)

(52) U.S. Cl.
CPC .................. *G01N 1/06* (2013.01); *H05F 3/04* (2013.01); *G01N 2001/061* (2013.01)

(58) Field of Classification Search
CPC ... G01N 1/00; G01N 1/04; G01N 1/06; G01B 2001/061; G01B 2001/063; G01B 2001/065; G01B 2001/066
USPC .......................................... 83/78–166, 915.5
See application file for complete search history.

(56) References Cited

U.S. PATENT DOCUMENTS

| | | | | | |
|---|---|---|---|---|---|
| 2,482,853 A | * | 9/1949 | Ladd | ......................... | G01N 1/06 83/410.7 |
| 3,667,330 A | * | 6/1972 | Kobernick | ............... | G01N 1/06 269/8 |
| 5,255,585 A | * | 10/1993 | Gordon | ................ | B26D 7/1863 15/315 |
| 5,740,708 A | * | 4/1998 | Tabone | .................... | G01N 1/06 83/100 |
| 5,974,811 A | * | 11/1999 | Heid | ......................... | A61L 9/04 62/320 |
| 8,025,842 B2 | * | 9/2011 | Nakajima | ................ | B26D 5/02 422/64 |

(Continued)

FOREIGN PATENT DOCUMENTS

GB   1335431 A   10/1973
JP   3545868 B2   7/2004

OTHER PUBLICATIONS

Leica RM2125 RTS: Rotary Microtome—Instructions for Use, Lieca Biosystems, Nov. 21, 2012.

(Continued)

*Primary Examiner* — Stephen Choi
*Assistant Examiner* — Richard D Crosby, Jr.

(57) ABSTRACT

This invention is based, at least in part, on use of a tissue collector that reduces or eliminates manual steps in collecting and transferring tissue sections from a microtome to a slide. This invention relates to apparatus and methods for automated tissue sectioning, including slicing and transferring a tissue section from a microtome. The invention also relates to automated systems and methods for slicing and transferring a tissue section onto a slide.

17 Claims, 7 Drawing Sheets

(56) References Cited

U.S. PATENT DOCUMENTS

| | | | | |
|---|---|---|---|---|
| 8,246,905 | B2* | 8/2012 | Teppke | A61L 2/20 422/1 |
| 8,997,615 | B2* | 4/2015 | Minemura | A01N 1/0257 83/170 |
| 10,197,476 | B2* | 2/2019 | Gong | G01N 1/18 |
| 10,483,084 | B2* | 11/2019 | Biberger | G01N 23/2252 |
| 2002/0088320 | A1* | 7/2002 | Marbach | B26D 7/1863 83/23 |
| 2002/0106626 | A1* | 8/2002 | Muraca | B01J 19/0046 435/1.3 |
| 2004/0261597 | A1 | 12/2004 | Thiem et al. | |
| 2007/0028736 | A1* | 2/2007 | Oh | B26F 3/002 83/100 |
| 2007/0204734 | A1* | 9/2007 | Ito | G01N 1/06 83/170 |
| 2009/0181457 | A1* | 7/2009 | Schmitt | G01N 1/06 435/379 |
| 2009/0183613 | A1* | 7/2009 | Lihl | G01N 1/06 83/167 |
| 2010/0050839 | A1* | 3/2010 | Miyatani | G01N 1/06 83/155.1 |
| 2010/0175520 | A1* | 7/2010 | Kong | G01N 1/06 83/13 |
| 2010/0216221 | A1 | 8/2010 | Walter et al. | |
| 2012/0055300 | A1* | 3/2012 | Kong | G01N 1/06 83/19 |
| 2012/0058509 | A1* | 3/2012 | Leininger | G01N 1/06 435/40.52 |
| 2014/0026683 | A1* | 1/2014 | Hayworth | G01N 1/06 73/863.01 |
| 2014/0041500 | A1* | 2/2014 | Isagawa | G01N 1/06 83/563 |
| 2014/0345433 | A1 | 11/2014 | Studer | |
| 2015/0047482 | A1* | 2/2015 | Stadtmuller | B26D 7/32 83/24 |
| 2015/0168277 | A1 | 6/2015 | Magavi et al. | |
| 2015/0198509 | A1 | 7/2015 | Williamson, IV et al. | |
| 2015/0338316 | A1* | 11/2015 | Chen | G01N 1/286 83/24 |
| 2017/0003309 | A1* | 1/2017 | Mitra | G01N 1/06 |
| 2017/0284904 | A1* | 10/2017 | Lim | G01N 1/06 |

OTHER PUBLICATIONS

Diatome: Static Line II Manual, Diatome Ltd, May 20, 2006.

Ladinsky, "Chapter Eight: Micromanipulator-Assisted Vitreous Cryosectioning and Sample Preparation by High-Pressure Freezing", Method in Enzymo, Academic Press, vol. 481, Jan. 1, 2010, 165-194.

Extended European Search Report for Application No. EP 17 16 3831, dated Aug. 21, 2017.

* cited by examiner

APPARATUS AND METHODS FOR TRANSFERRING A TISSUE SECTION

CROSS-REFERENCE TO RELATED APPLICATIONS

This application claims benefit of the filing date of and right of priority to U.S. Provisional Application No. 62/316,192, filed Mar. 31, 2016, which is incorporated by reference herein.

FIELD OF THE INVENTION

This invention relates to apparatus and methods for slicing and transferring a tissue section from a microtome. The invention also relates to automated systems and methods for slicing and transferring a tissue section onto a slide.

BACKGROUND OF THE INVENTION

Microtomes are used to cut extremely thin slices of tissue, known as tissue sections, for microscopic observation under transmitted light or electron radiation. Microtomes use extremely sharp knives to slice thin tissue sections of a desired thickness from a sample. The knife is held by a knife holder which can be adjusted to cut at a selected thickness. The tissue sections can then be retrieved from the microtome, usually by manual retrieval, such as by an operator using a grasping tool, transferred to a slide, and examined with an optical or an electron microscope or by other techniques. Because the tissue sections are extremely thin, with some having sub-micron thickness, they may be difficult to collect and transfer without damage or contamination.

A rotary microtome such as the Leica RM2125 RTS comprises a handwheel that moves a sample holder downward, so that the held sample is sliced by the knife. The rotary microtome has a housing on which a knife holder, the sample holder, the handwheel and other elements are all assembled, with various clamps for holding the moving pieces in position. The knife holder typically includes a front plate, and the sliced tissue section may lie on the front plate after slicing. The slicing is a manual operation, with each section being sliced via rotation of the handwheel.

US Patent Application Publication No. 20040261597 to Thiem et al. discloses a rotary microtome having a base part on which a microtome housing and a knife holder are arranged. A collection element surrounds the knife holder on three sides and has a U-shaped base outline. Several clamping levers are associated with the knife and knife holder, the clamping lever to the knife holder is on the outside of the collection element, reducing the number of levers on the knife holder and simplifying cleaning. The collection element is configured so that tissue sections may be easily cleaned out of it and so that the user does not get caught on it or the microtome housing.

US Patent Application Publication No. 20100216221 to Walter et al. discloses a device for applying a histological section to a slide. The histological section is generated by a cutting action performed by a blade of a microtome. The device comprises a positioning device having a component that is rotatably mounted to a bearing and has a receptacle for receiving and holding the slide, wherein the positioning device is designed such that the slide received in the receptacle can be rotated about an axis of rotation of the rotatably mounted component.

US Patent Application Publication No. 20090181457 to Schmitt discloses an apparatus and a method for isolating histological sections produced with a microtome. A previously and currently produced histological section are connected to form a section strip. In order to simplify isolating the previously and currently produced histological sections from each other, a nozzle device is provided by means of which the histological sections when positioned on a blade holder are subjected to an air stream of adjusted direction and intensity so that the previously produced histological section of the section strip is separated from the currently produced histological section that is positioned on the blade holder and is removed from the blade holder.

US Patent Application Publication No. 20150168277 to Magavi et al. discloses apparatuses and methods for handling a portion of a tissue sample when sectioned by a microtome. The apparatuses include a container, a tissue sample holder in the container, and one or more outlets configured to allow flow of a fluid from the container. The flow through the outlet causes a portion of the tissue sample sectioned by a microtome to move into the outlet. The methods include sectioning one or more portions of a tissue sample, and flowing a fluid past the tissue sample to cause the one or more portions of the tissue sample to move away from the tissue sample and toward at least one fluid outlet.

US Patent Application Publication No. 20150198509 to Williamson et al. discloses an automated machine for handling and embedding tissue samples contained on microtome sectionable supports. The machine includes an input member configured to hold a plurality of the microtome sectionable supports prior to a tissue embedding operation. An output member is configured to hold a plurality of the microtome sectionable supports after the tissue embedding operation. A cooling unit is configured to hold at least one of the microtome sectionable supports during the tissue embedding operation. A motorized carrier assembly is mounted for movement and configured to hold at least one of the microtome sectionable supports. The carrier assembly moves the support from the input member to the cooling unit and, finally, to the output member. A dispensing device dispenses an embedding material onto the microtome sectionable support and at least one tissue sample carried by the microtome sectionable support during the embedding operation.

A traditional approach for slicing tissue sections using a microtome involves creating a strip or ribbon of tissue sections from a tissue sample (such as a tissue embedded in paraffin). After a tissue section is created, the trailing edge of the section adheres to the knife, which allows an attachment point between the sliced tissue section and a subsequently sliced section, and so on, thereby creating a ribbon of tissue sections. Often only one or two sections from the ribbon are actually used and mounted onto a slide, since the first section sliced by the microtome is hard to manipulate without damage. This causes the first section to be a sacrificial section and waste of the sample. Often the first section of the ribbon will curl or collide with the knife holder, requiring the user of the microtome to intervene so as to remove the tissue section. If the first section sliced from the sample block could be obtained without this user intervention, the first section could be used directly and it would remove the need to create a ribbon.

US Patent Application Publication No. 20140345433 to Studer discusses a device for transferring a section ribbon to a specimen holder for use in transmission electron microscopy (TEM), the section ribbon being transferred to the specimen holder by way of an ionization device in a microtome apparatus.

The "Static-Line" II from DiATOME (Hatfield, Pa.) is an anti-static device which emits negative and positive ions neutralizing electrostatic charges. It is marketed for use in ultramicrotomy, so that tissue sections no longer stick to the knife edge or bunch up on each other, but rather float in a ribbon over the surface of the knife.

Apparatus and methods for automated collection and transfer of a tissue section from a microtome to a slide would increase efficiency and quality of the tissue section.

DETAILED DESCRIPTION OF THE INVENTION

This invention is based, at least in part, on use of a tissue collector that reduces or eliminates manual steps in collecting and transferring tissue sections from a microtome to a slide.

I. Definitions

A pneumatic apparatus contains or operates by air or gas under positive and/or reduced pressure. A pneumatic source is a source of positive pressure and/or reduced pressure, and commonly employs compressed air or inert gases as positive pressure gases, or a pump may be used to create positive pressure or reduced pressure. Other pneumatic sources include bellows or bulb syringes, which may be actuated manually or automatedly. The positive pressure source may be a tank of pressurized oxygen, nitrogen, air or another gas. Alternatively, the pneumatic source may be a pump. A valve may be provided to control the pressure from the pneumatic source. The pneumatic source or its valve can be in signal communication and/or controlled by a controller. The controller for the pneumatic source can also be in signal communication with and configured to control other apparatus, such as the tissue collector described below.

"Positive pressure" is a pressure greater than the surrounding environment, such as greater than atmospheric pressure. The pressure gradient between positive pressure and the ambient pressure will propel a tissue section away from the positive pressure and toward the low pressure area.

"Reduced pressure" is a pressure less than the surrounding environment or a sub-ambient pressure. "Suction" is the flow of gas into a partial vacuum or region of reduced pressure. The pressure gradient between this region and the ambient pressure will cause the matter to move toward the reduced pressure area. In certain embodiments, a sub-atmospheric pressure is a reduced pressure.

A tissue section is an extremely thin slice of a tissue which may be suitable for microscopic examination, for example, from about 1 to about 100 microns, alternatively from about 1 to about 30 microns, alternatively from about 3 to about 10 microns.

II. Microtome

Figure 1:
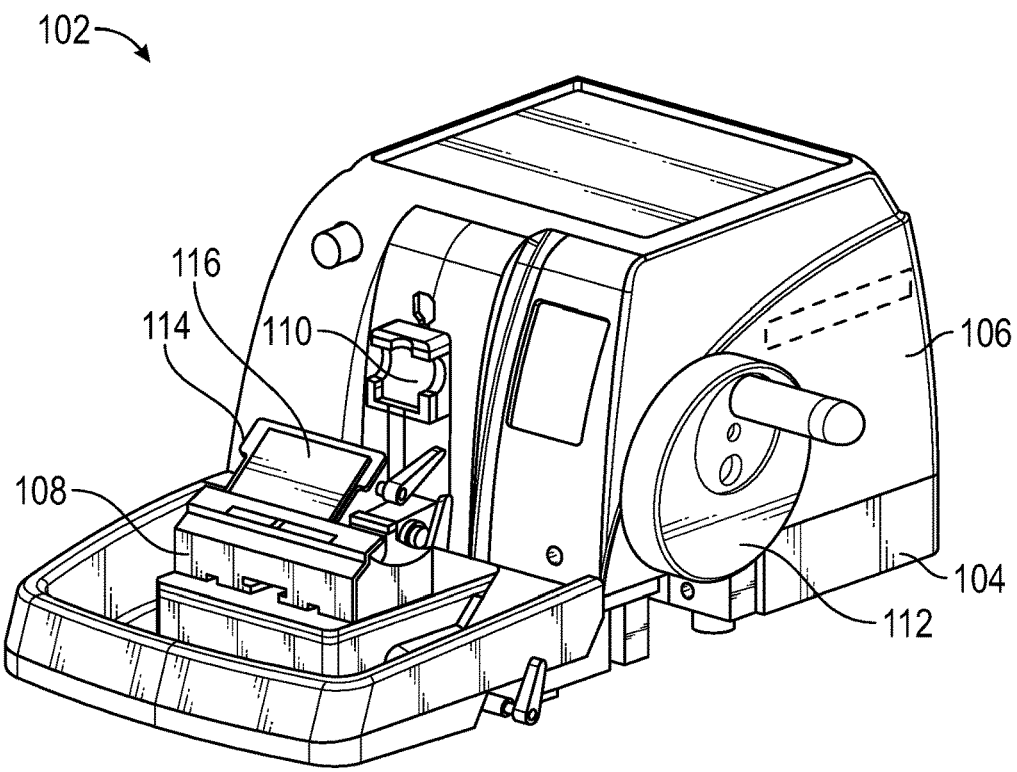
FIG. 1 is a perspective view of standard rotary microtome.

FIG. 1 is a perspective view of standard rotary microtome 102. The rotary microtome 102 comprises a base 104 and a microtome housing 106 provided on the base. A knife holder 108 is placed on the base 104. Opposite to the knife holder 108 on the microtome housing 106 is a sample holder 110. The sample holder can be moved up and down by means of a handwheel 112 provided on microtome housing 106. Knife holder 108 and sample holder 110 are arranged oppositely from one another. The knife holder 108 supports a front plate 116, which may be a knife pressure plate which applies pressure to the knife 118. The knife holder 108 is supported by various clamps and supports. The knife holder 108 can be moved linearly along rails to adjust the thickness sliced from a tissue sample. It also allows adjustment of the angle at which the knife 114 contacts the tissue sample. The rotary microtome is shown and described as an example, as the present apparatus and methods can also be used with other types of microtomes.

III. Positive Pressure Supplier

Figure 2A:
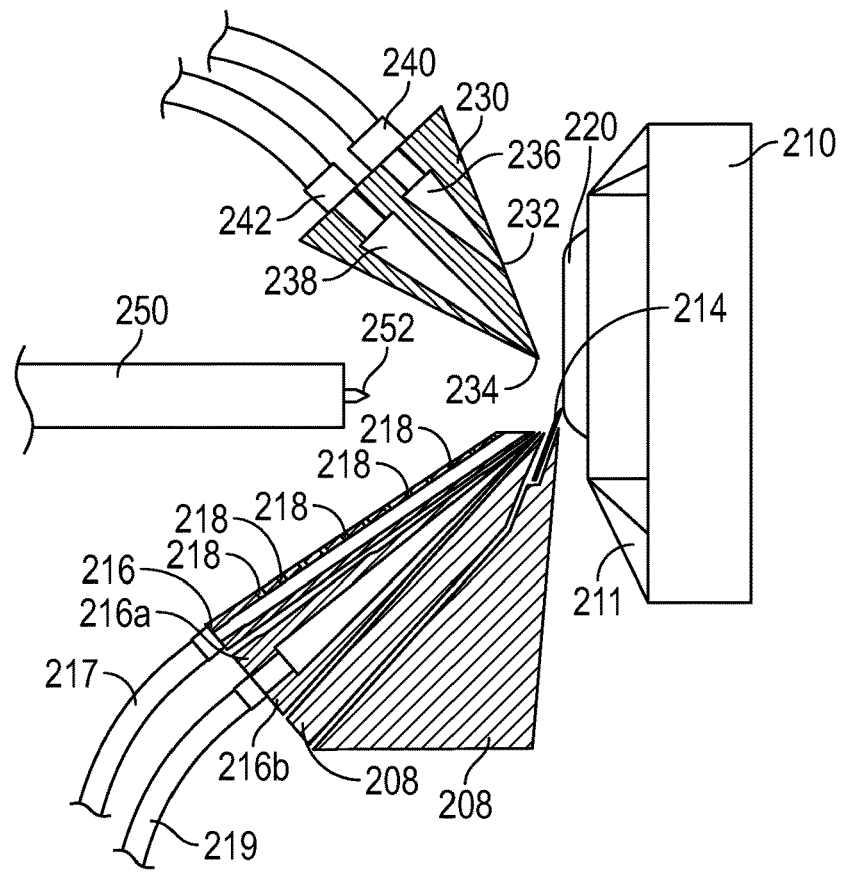
FIGS. 2A and 2B are illustrations of embodiments of positive pressure suppliers adapted for use with a microtome.

FIG. 2A shows an embodiment of a positive pressure direction supplier for a tissue section. As tissue sections are sliced from a sample by a knife, pressurized gas (typically air) blows on the tissue section as it is sliced in order to prevent the tissue section from sticking as well as to prevent the tissue section from deforming or curling on itself. The pressurized gas can be blown from above and/or below the top of the tissue sample, and/or on either or both sides of the sliced tissue section. More particularly, FIG. 2A shows a gas supplier 230 which can be positioned above and in front of the tissue section to be sliced by the knife from a tissue sample 220. In this embodiment, the gas supplier has the shape and design of an air blade which provides a line of positive pressure air. The gas supplier 230 is adapted to supply one or more streams of gas across the front surface of the tissue section (the surface opposite the sample holder) as it is sliced from the sample, thereby preventing deformation such as curling or bunching and maintaining two-dimensional stability.

FIG. 2A, during the slicing of tissue sections from a sample by a microtome knife, pressurized gas (typically air) is blown from two outlets 232, 234. In this embodiment, positive pressure gas is applied from front outlet 232 to the tissue section as it is sliced, at an angle rather than directly, and a positive pressure gas is applied at the front plate from rear outlet 234 before the tissue section is completely sliced from the tissue sample. In some embodiments, the positive pressure gas is an ionized gas. In this embodiments, the positive pressure supplier comprises at least two outlets which provide gas at different angles with respect to the sample holder.

More particularly, FIG. 2A shows a gas supplier 230 located proximate to the tissue section sliced by the knife from a tissue sample. In this embodiment, the gas supplier 230 has the shape and design of a dual air blade which provides two blades of positive pressure gas through front outlet 232 and rear outlet 234. Each of these outlets 232, 234 can be one or more holes or can be a continuous or discontinuous slit. The gas supplier 230 is adapted to supply a stream of gas from the front outlet 232 across the surface of the tissue section as it is sliced from the sample, thereby preventing deformation. The gas supplier 230 is also adapted to supply stream of gas from the rear outlet 234 directed downward or parallel to the surface of the tissue sample, or the rear outlet 234 is parallel to the surface of the tissue sample. The rear outlet 234 blows ionized gas onto the front plate. The gas and ion supplier 230 has manifolds 236, 238 for each outlet 232, 234 through which gas is blown or expelled. The gas and ion supplier 230 has inlets 240, 242 configured to receive gas supply conduits for each manifold 236, 238. The apparatus can include a flange for fastening the gas supplier 230 to a moveable support, such as an automated apparatus configured to automate movement and/or operation of the gas supplier 230, including controlling movement of the supplier toward and away from the microtome, and/or controlling the supply of positive pressure gas to the outlets 232, 234. The gas and ion supplier 230 can also include one or more ionizer holders through which single point ionizers can be inserted and positioned for ionizing an environment around the tissue section and front plate. The ionizer can be oriented relative to the front plate at an angle of about 0° (parallel) to about 90° (perpendicular) (or up to about 180°, if viewed from another viewpoint).

FIG. 2A shows the gas supplier 230 positioned at the slicing area of a rotary microtome 202, which may be a previously existing design or a new design adapted for use with the apparatus and methods of the present disclosure. A knife holder 208 is proximate to a sample holder 210 which can be moved up and down in order to slice tissue sections from a tissue sample 220. Alternatively the sample holder 210 may be stationary, and the knife holder 208 can be moved to slice the tissue sections. The knife holder 208 and the sample holder 210 are arranged oppositely from one another. The knife holder 208 supports a front plate 216 which applies pressure to the knife 214. In some embodiments, the front plate 216 is fluidly connected to a positive pressure source, such as by conduit 217. Front plate 216 has an interior manifold and/or channels which lead from an inlet, and the inlet is configured for attachment to a conduit 217. Apertures on the face of the front plate 218 are fluidly connected to the interior manifold, thereby providing a gas layer on the front plate, or a gas table for receiving a tissue section. In some embodiments, front plate 216 has two sections 216a, 216b, which together define a flow path (such as a gap, channel(s) or other arrangement). A positive pressure source provides positive pressure gas through conduit 219, which the front plate expels or blows from the flow path and toward the tissue section. In the manner, a gas blade is applied along the knife 214 and at a point of contact between the knife and the tissue sample, or at a point of slicing the tissue section from the tissue sample 220.

IV. Ionization Supplier

In some embodiments, the environment around the tissue section and/or front plate is ionized. More particularly, positive and negative ions are produced by the ionizer, and those ions neutralize static present at the tissue section and/or front plate. By ionizing this environment, electrostatic charge on the surface of the tissue section is reduced or eliminated, thereby reducing or eliminating bunching of the tissue section due to attraction between electric charges. This electrostatic effect can cause sticking of the tissue section to the knife edge or the front plate. By ionizing the environment around the tissue and thus improves the recovery of tissue sections during or after the slicing process.

FIG. 2A also shows a single point ionizer 250 positioned to ionize the environment around the tissue section and/or front plate. In FIG. 2A, one ionizer 250 is visible, though two or more single point ionizer may be held and positioned around the tissue sample. Single point ionizers are commercially available from several sources and are used in a variety of applications for neutralizing static charge. For example, ionizer model 5851 from EXAIR is suitable for supplying neutralizing ions 252 to a surface within about 50 mm.

The apparatus shown in FIG. 2A is operated as follows. A tissue sample is securely clamped or inserted into the sample holder 210 such as by clamps 211, which is positioned above the knife 214 and locked in place at that point. The knife holder 208 is moved into the desired position, where it will slice a tissue section of desired thickness, and locked or clamped in place. A gas supplier or other pneumatic source is activated so as to blow a relatively gentle supply of positive pressure gas to gas and ion supplier 230. A pneumatic source (the same or different than that feeding the gas supplier) is activated to supply positive pressure gas to the front plate 216, where it passes through small apertures on the front plate to provide a bed of gas on the front plate 216. In some embodiments, the front plate has one or more apertures configured for passage of a positive pressure gas and/or gas moved by reduced pressure. The operator then turns the handwheel, lowering the sample holder 210 so the tissue sample engages the knife 214. As the tissue section is sliced, positive pressure gas from the gas supplier and apertures blows on the tissue section, thereby reducing or preventing deformation (such as curling or bunching) of the tissue section.

Blowing nonionized gas or air at the tissue section, particularly at downward angle, and blowing ionized air at the front plate in close temporal succession yields a surprisingly flat tissue section which is easy to transfer to a slide. For example, the present methods and apparatus are configured for a positive pressure gas to be applied to a tissue section beginning approximately simultaneously when the tissue sample initially contacts the knife for slicing, and for an ionized positive pressure gas to be applied to a front plate after the tissue sample initially contacts the knife but before the knife completes slicing a tissue section from the tissue sample 220. The non-ionized positive pressure gas can be pulsed, for 2 seconds or less, alternatively 1 second or less, alternatively for less than a time for completely slicing the tissue section. Simultaneously or shortly after the non-ionized positive pressure gas pulse, ionized positive pressure gas can be pulsed, for 2 seconds or less, alternatively 1 second or less, alternatively for less than a time for completely slicing the tissue section, and an ionized positive pressure gas is applied at the front plate before the tissue section is completely sliced from the tissue sample. In some embodiments, the positive pressure gas is blown at the tissue section at an angle rather than directly. If a stream of gas perpendicular to the tissue section is at 90°, and a stream parallel to the tissue sample 258 is at 0°, then the present methods and apparatus can be configured to blow a stream of positive pressure gas onto a tissue section or onto the sample holder 260 of the microtome at a non-perpendicular angle, for example an angle between about 10° and about 70°, alternatively between about 20° and about 60°. The present methods and apparatus can be configured to blow a stream of ionized positive pressure gas onto a front plate or into an environment around the front plate 216 and/or tissue sample 220 at an angle parallel to the tissue section or the sample holder 210 of a microtome, for example at an angle between about 0° and about 20°, alternatively between about 0° and about 5°.

The gas table or gas layer supplied from the front plate reduces or prevents the tissue section from sticking. In some embodiments, a large grid of small air channels creates an air cushion effect over the surface of the front pressure plate. The holes in the front plate prevent the tissue from sticking to the plate. Thus, the application of the positive pressure gas will prevent the tissue section from sticking to the knife and/or the front pressure plate.

Figure 2B:
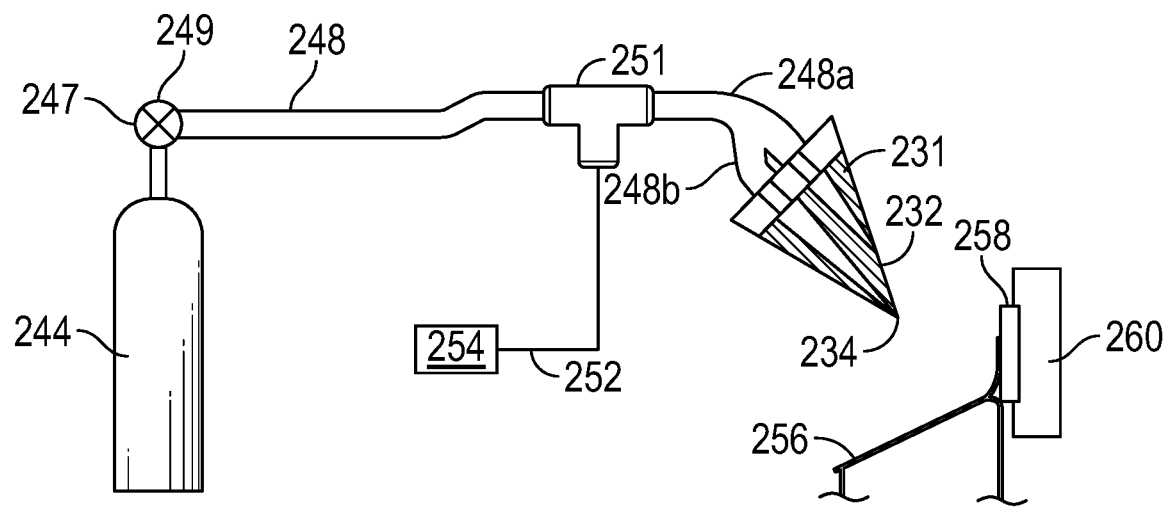

FIG. 2B shows another embodiment of a gas and ion supplier 231, in which the supplier 231 receives ionized positive pressure gas through conduits with an in-line ionizer 251 in fluid communication. The gas and ion supplier 231 is connected to a positive pressure source 244, which may be a tank of pressurized oxygen, nitrogen, air or another gas. Alternatively, the positive pressure source may be a pump. A valve 247 controls the pressure of the positive pressure gas provided to the gas and ion supplier 230. The valve 247 can be controlled by and/or in signal communication with a controller 249. The controller 249 can also be in signal communication with and configured to control other apparatus, such as the tissue collector described below; alternatively, a separate controller can be provided specifically for the gas and ion supplier.

Positive pressure gas from the source 244 and valve 247 passes to a main gas conduit 248 which splits into one or more gas conduits 248a, 248b which pass the positive pressure gas to the inlets of the gas and ion supplier 230. Gas conduit 248 has an in-line ionizer 251 that introduces ions into the positive pressure gas. Gas conduit 248a is fluidly connected to the front inlet 240, front manifold 236 and front outlet 232 so that positive pressure gas is applied to the tissue section. Gas conduit 248b is in fluid communication with rear inlet 242, rear manifold 238 and rear outlet 234 so that an ionized positive pressure gas is applied to or near the front plate 256 of the microtome. The in-line ionizer 251 has an electrical connection 252 to a power source 254. In other embodiments, gas conduits 248a and 248b are separately connected to a positive pressure source with separate valves, or to separate positive pressure sources, and they do not have a common gas conduit 248 or valve 247. The ionizer 251 emits negative and positive ions at a level sufficient so that electrostatic charges at the front plate and/or tissue section are substantially neutralized. For example, a TAKK Model 5860 In-Line Ionizer is a compact in-line compressed air static eliminator that can be easily installed in gas conduit 248. It can be installed by cutting gas conduit 248 in two and inserting the ionizer's fittings into the ends of the conduit. It should be recognized that FIG. 2B is not drawn to scale.

V. Apparatus for Transferring a Tissue Section

Figure 3A:
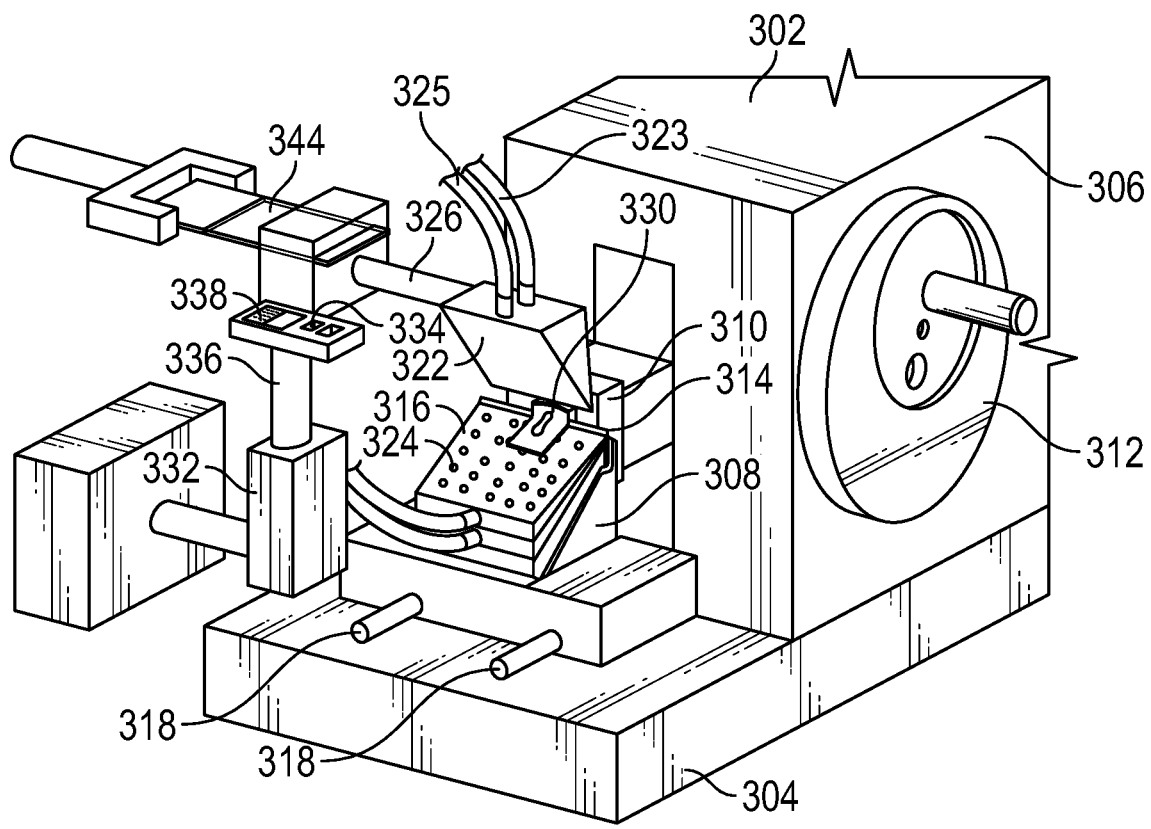
FIGS. 3A to 3C are perspective views of an apparatus for tissue section collection and transfer.
Figure 3B:
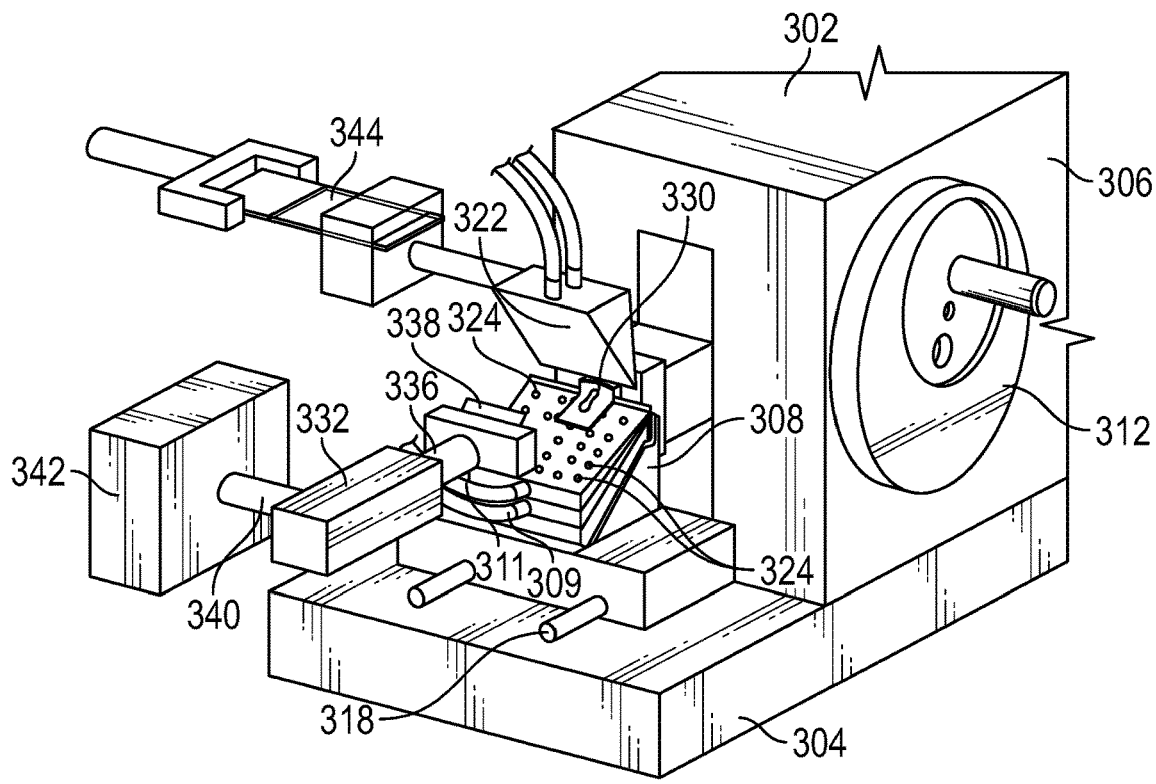
Figure 3C:
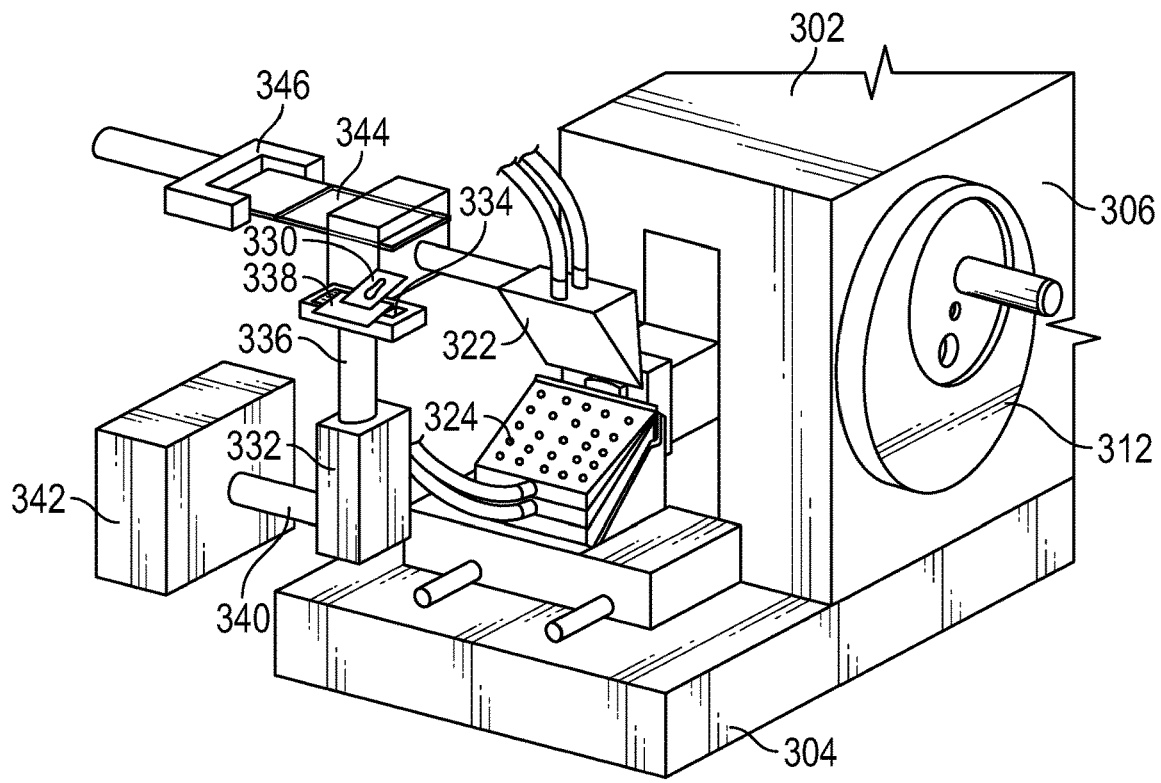

FIG. 3A to 3C are perspective views of an apparatus for automated tissue section transfer. In FIG. 3A, a tissue section has been sliced by the knife 314 of a microtome, with the aid of an air blade. The tissue section rests on the front plate of the knife holder, optionally supported by a cushion of air or other gas. In FIG. 3B, a tissue collector is rotating toward a position where it will collect the tissue section from the front plate. In this embodiment, the tissue collector has an extendible arm and an adhesive strip attached to the arm, and it extends to collect the tissue section from the front plate. In FIG. 3C, the tissue collector has moved to a position where the tissue section and the adhesive strip are attached to a slide and released from the tissue collector.

More particularly in FIGS. 3A to 3C, the apparatus includes a rotary microtome 302, which may be a previously existing design or a new design adapted for use with the apparatus and methods of the present disclosure. For example, the rotary microtome 302 may include a base 304 and a microtome housing 306 provided on the base 304. A knife holder 308 is located on the base 304. A sample holder 310 can be moved up and down by means of a handwheel 312 provided on microtome housing 306. The knife holder 308 and the sample holder 310 are arranged oppositely from one another. The knife holder 308 supports a front plate 316 (also called a knife pressure plate) which applies pressure to the knife 314. The knife holder 308 is supported by various clamps, supports and rails 318. The sample holder 310 can be adjusted to select the thickness sliced from a tissue sample. It also allows adjustment of the angle at which the knife 314 contacts the tissue sample.

The apparatus is operated as follows. A tissue sample is securely clamped or inserted into the sample holder 310, which is moved about the knife 314 and locked in place at that point. The knife holder 308 is moved into the desired position, where it will slice a tissue section of desired thickness, and locked or clamped in place. The gas supplier 322 is activated so as to blow a gentle line of positive pressure gas from conduits 323, 325. A pneumatic source (the same or different than that feeding the gas supplier 322) is activated to supply positive pressure gas to the front plate 316, where it passes through small apertures 324 on the front plate to provide a bed of gas on the front plate 316. The operator then turns the handwheel 312, lowering the sample holder 310 so the tissue sample engages the knife 314. As the tissue section 330 is sliced, positive pressure gas from the gas supplier 322 and apertures 324 blows on the tissue section 330, thereby reducing or preventing deformation (such as curling or bunching) of the tissue section 330. Positive pressure gas is supplied to apertures via conduit 309, the front plate may include a flow path adapted for blowing gas from conduit 311 onto tissue section as it is sliced.

The gas supplier 322 can be moved away from the front plate 316 and the tissue slicing area in general, as it is connected to a shaft 326 which can be moved linearly and/or rotationally. This movement of the gas supplier 322 and the shaft 326 can be manual or automated. For example, shaft 326 can be connected to and operated by an actuator which receives control signals from a controller.

In some embodiments, the apparatus includes a tissue collector 332 adapted for collecting the tissue section 330 from the front plate 316 in an automated fashion. The apparatus can comprise an automated tissue collector adapted for movement in relation to the knife, such that the tissue collector can contact the tissue section after slicing. For example the tissue collector 332 can include one or more apertures 334 through which a reduced pressure (resulting in suction) is provided. Apertures are fluidly connected to a pneumatic source, which may be the same or different than the pneumatic source for the gas supplier (air blade) 322 and front plate apertures 324. When the tissue collector 332 or a portion thereof makes contact with or is sufficiently close to the tissue section 330, the tissue section 330 is held to the tissue collector 332 by the reduced pressure at the apertures 334. The tissue collector 332 may include an extendible portion such as an arm 336 which contacts or comes close to the tissue section 330.

In some embodiments, the tissue collector employs an adhesive material in place of or in addition to reduced pressure. For example, the tissue collector 332 may use an adhesive material 338 such as an adhesive strip, which is removably attached to the tissue collector or an extendible portion thereof by reduced pressure at apertures 334, by an adhesive, by both, and/or by other means. The adhesive material 338 contacts the tissue section 330 and adheres to it. In some embodiments, a first portion of the adhesive material attaches to the tissue section and a second portion of the adhesive material is on the tissue collector but does not attach to or contact the tissue section.

The tissue collector 332 is adapted for movement so that it can collect a tissue section from a microtome and transfer it to a slide. For example, the apparatus can be comprise an automated tissue collector attached to a rotating support whose rotation changes position of the automated tissue collector. In the embodiment shown in FIGS. 3A to 3C, the tissue collector 332 is adapted for rotational movement, as it is attached by a shaft 340 to a support 342. The support 342 may be operated manually or by automation, such as by a controller and may rotate the shaft 340, which may contain wiring for the tissue collector 332. The support 342 moves the tissue collector 332 to first, second, and more positions where various operations are performed. As discussed above, the tissue collector 332 may be placed in a position to collect a tissue section 330 from a microtome. After that, the tissue collector can be rotated or otherwise moved so that it is in a position to transfer the tissue section to a slide 344.

After acquiring the tissue section, the arm 336 moves so that the tissue section is positioned near a slide. The arm may be adapted for rotational and/or linear motion. The arm or a portion thereof extends again so that the tissue section and optionally an adhesive material makes contact with the slide, so that the tissue section is deposited on the slide. The arm then retracts but leaves the tissue section adhered to the slide, optionally by operation or assistance of the adhesive material.

In FIG. 3C, the tissue collector 332 has been rotated, and an arm has been extended, so that the tissue section 330 and the adhesive material 338 are in motion toward contacting a slide 344 held by a slide holder 346. The tissue section 330 adheres to the bottom side of slide 344 itself, but the adhesive material 338 makes a stronger attachment to the slide 344 particular the portion of the adhesive strip which is not attached to the tissue section. At this point, the reduced pressure holding the adhesive material 338 to the apertures 334 of the tissue collector can be halted, thereby releasing the adhesive material 338 from the tissue collector 332. The adhesive material 338 can be removed from the slide (manually or by automation) so as to leave the tissue section 330 on the slide 344 (though a portion of the tissue section may remain on the adhesive strip).

After the tissue section and adhesive strip have been transferred to the slide, the apparatus can be prepared for its next use. The tissue collector 332 can be rotated or otherwise moved to a reloading position, which is at or near an adhesive source 348 such as a dispenser of adhesive materials 338 such as adhesive strips. Reduced pressure is applied at the apertures 334 of the tissue collector 332 in order to pull a new, clean adhesive strip onto the end. The tissue collector can be rotated or otherwise moved before, during or after the slicing of the next tissue section.

As mentioned, the tissue collector, or a portion thereof such as an arm, may be adapted to move so that it is in position to contact and/or collect the tissue section. The exterior surface of the tissue collector or the arm can be flat, cylindrical, octagonal, or another shape and can be adapted for additional movement. For example, an arm of the tissue collector may be adapted to extend and retract along a track 349 in the main body of the tissue collector 332, so that an arm 336 can be extended to the tissue section or the slide, make contact with the tissue section or the slide, and be retracted, thereby allowing a collecting end of the tissue collector to be in contact with or in sufficient proximity to the tissue section such that the tissue is collected by the tissue collector. In some embodiments, the arm is capable of rotational motion, so that the end can be rotated between positions where it contacts and/or collects the tissue section and where it deposits the tissue section on to a slide. Optionally, the arm or tissue collector is adapted for rotation to other positions where other functions or steps are performed.

In some embodiments of the present apparatus, the slide is held by a slide holder 346, which may also be automated. The slide holder 346 may be adapted for rotational and/or linear motion. The slide holder can transport the slide 344 to a slide bath, which is sequentially filled with ice water (or other liquid), following by circulating warm water (or other liquid). The slide holder can be located near one of the positions of the tissue collector and capable of motion to submerge a held slide into the slide bath. The sequence of contacting the tissue section on the slide with ice water followed by warm water promotes the flattening of the tissue section on the slide, without bunching or bubbles. The adhesive strip can then be removed, resulting in a tissue section ready for conventional processing (deparaffination, stringency washing, cover slipping, staining, enzymatic treatment, etc.). A positive pressure supplier can be provided proximate to the slide bath, so that positive pressure gas can be applied to the tissue section as it is placed into the slide bath and/or as it is removed from the slide bath.

Through the use of the apparatus and method described herein, a tissue section may be transferred from a microtome to a slide without manual action on the tissue section, in an automated manner. A tissue section may be transferred without manual contact with the tissue section, such as by a user grasping the tissue section by hand or with a handheld instrument. More particularly, a freshly-sliced tissue section may be removed from a microtome without manual contact, and/or a tissue section may be placed on a slide without manual contact. The apparatus and methods also enable slicing and transferring of tissue sections having good two-dimensional stability, with bunching or curling, and avoid waste of tissue sections.

Figure 4:
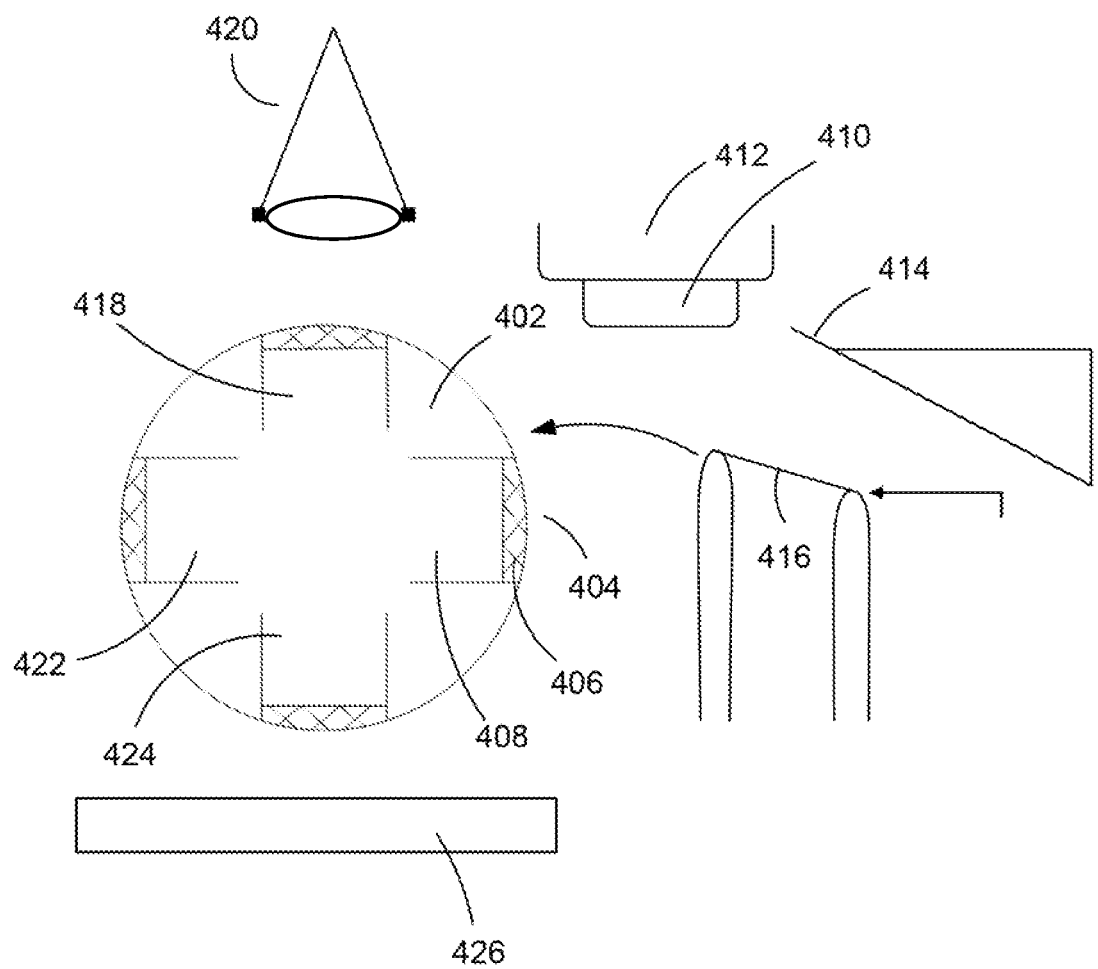
FIG. 4 is a diagram of a tissue collector for holding a tissue section, illustrating four positions.

Other embodiments of the present apparatus are envisioned. For example, in some embodiments, the tissue collector comprises a rotatable stage. FIG. 4 illustrates a rotatable stage 402 adapted for collecting, moving, and depositing a tissue section. The stage 402 has at least one aperture 404 covered by a gas-permeable, tissue-impermeable barrier 406. The aperture 404 is fluidly connected to an interior channel 408, which can provide reduced pressure (suction) at the aperture 404 or positive pressure at the aperture. The barrier 406 can be a mesh or other material which allows gas flow so that a tissue section can be pulled to the barrier 406 by suction but does not pass into the interior channel 408. Other apertures 324, 334 described above may also have such barriers and channel connections. The interior channels can fluidly connect the apertures to a pneumatic source.

In operation, the stage will be positioned near a tissue sample 410 held by a sample holder 412. The tissue knife 414 moves toward the stage 402, slicing an extremely thin tissue section as it moves. The slices tissue section adheres to the edge of the knife 414 until it is sufficiently close to the stage 402. The tissue section is pulled onto the aperture 404 (or more precisely, onto the barrier 406) by a reduced pressure or suction through the aperture 404. The tissue section may be transferred directly from the knife 414 to the stage 402, or a wire 416 or other carrier may clear the tissue section from the knife 414 and carry it to the stage 402.

In order to assess the tissue section quality, an imaging step is performed. An image of the tissue section generated by the sectioning of sample 410 is automatically acquired at the second position 418 of the stage 402 with the aid of an imager 420, such as a camera, visual sensor, detector or other device adapted to capture an image of a physical object such as a tissue section. An assessment device such as a monitor has a signal connection to the imager 420 and serves not only for determination of the trimming plane, but also for the assessment (e.g., detection and/or evaluation) of specific patterns in the image, in particular for evaluation of the image in terms of defined characteristic values for thin-section quality. An assessment, such as whether to reject the tissue section or to accept it for analysis, is made while the aperture 404 is at the second position 418 or while the stage 402 is rotating the aperture 404 between the second position 418 and the third position 422. The tissue collector 332 of FIGS. 3A to 3C may also be adapted for movement to a second position for inspection of the tissue section.

The stage 402 then rotates to a third position 422 where the tissue is discarded if its quality is assessed to be insufficient, unsuitable or unwanted. The tissue section can be discarded by ceasing reduced pressure applied at the barrier 406, causing the tissue section to fall from the barrier 406. Alternatively or additionally, a positive pressure may be created at the barrier 406, which forces the tissue section off the barrier 406. The tissue collector of FIGS. 3A to 3C may also be adapted for movement to this third position. An automated system or method may including determining the quality of the tissue section while the stage 402 is rotating, and subsequently discarding or retaining the tissue section.

At a fourth position 424, if the tissue section was not discarded, the stage 402 releases the tissue section onto a slide 426 or other surface. The slide 426 may then be removed or routed to storage, for further processing (such as staining), or for evaluation (e.g., microscopic viewing). An automated slide holder such as slide holder 346 may move the slide to a water bath.

Figure 5A:
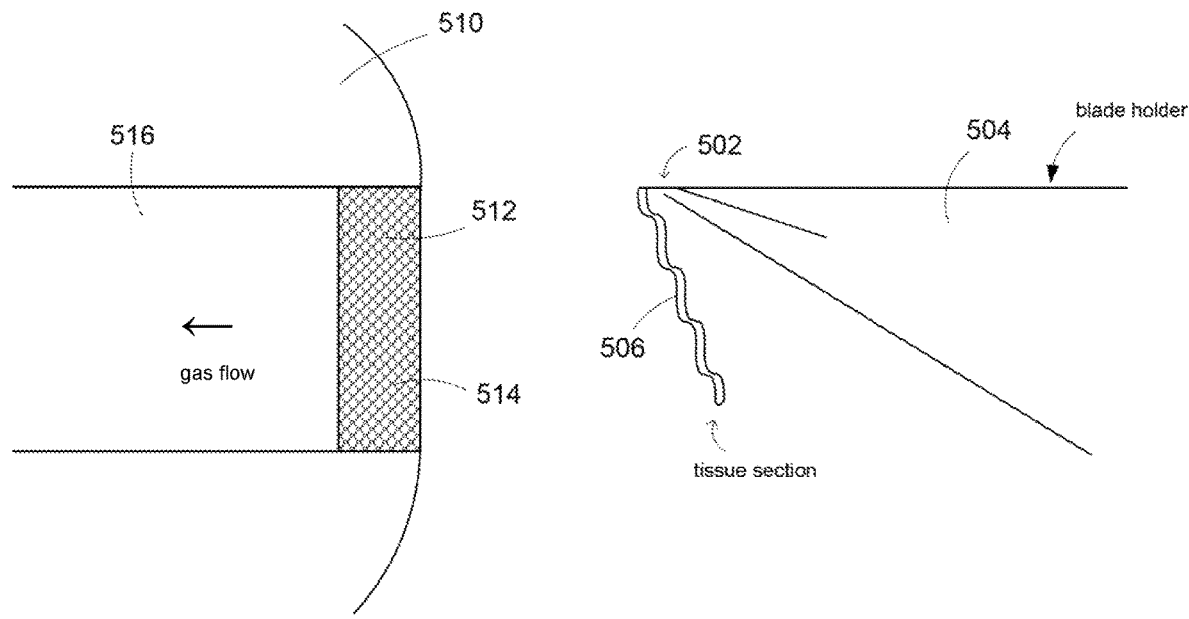
FIGS. 5A and 5B are diagrams of operation when the tissue collector is at a first position.
Figure 5B:
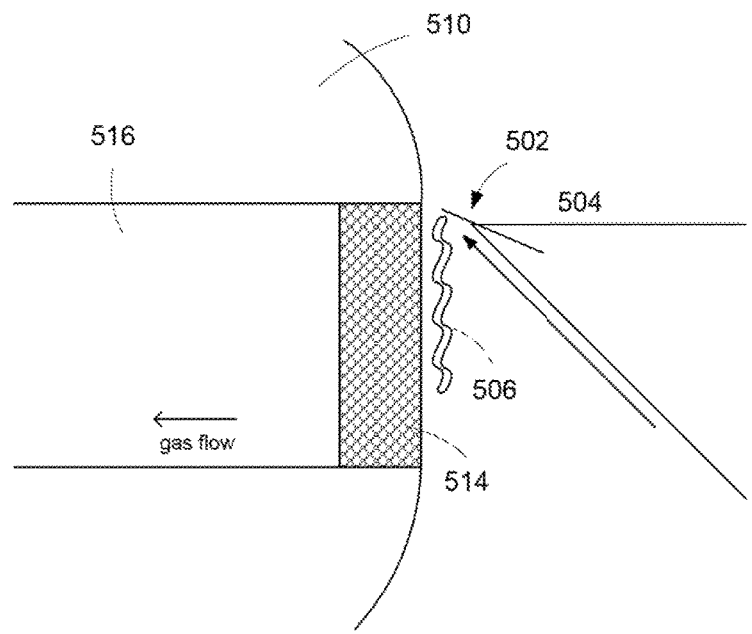

FIGS. 5A and 5B show operation of the tissue collector at the first position in more detail. The knife 502 held by a knife holder 504 with a freshly-sliced tissue section 506 attached at its edge. The knife 502 moves toward the stage 510, and when it is sufficiently close, gas flow pulls the tissue section 506 onto the barrier 512 covering the aperture 514. The interior channel 516 has a gas flow moving away from the barrier 512, thereby creating suction which pulls and holds the tissue section on the barrier 512. Alternatively, an adhesive strip may be held at the barrier, and the tissue collector moves to contact the tissue section.

Figure 6:
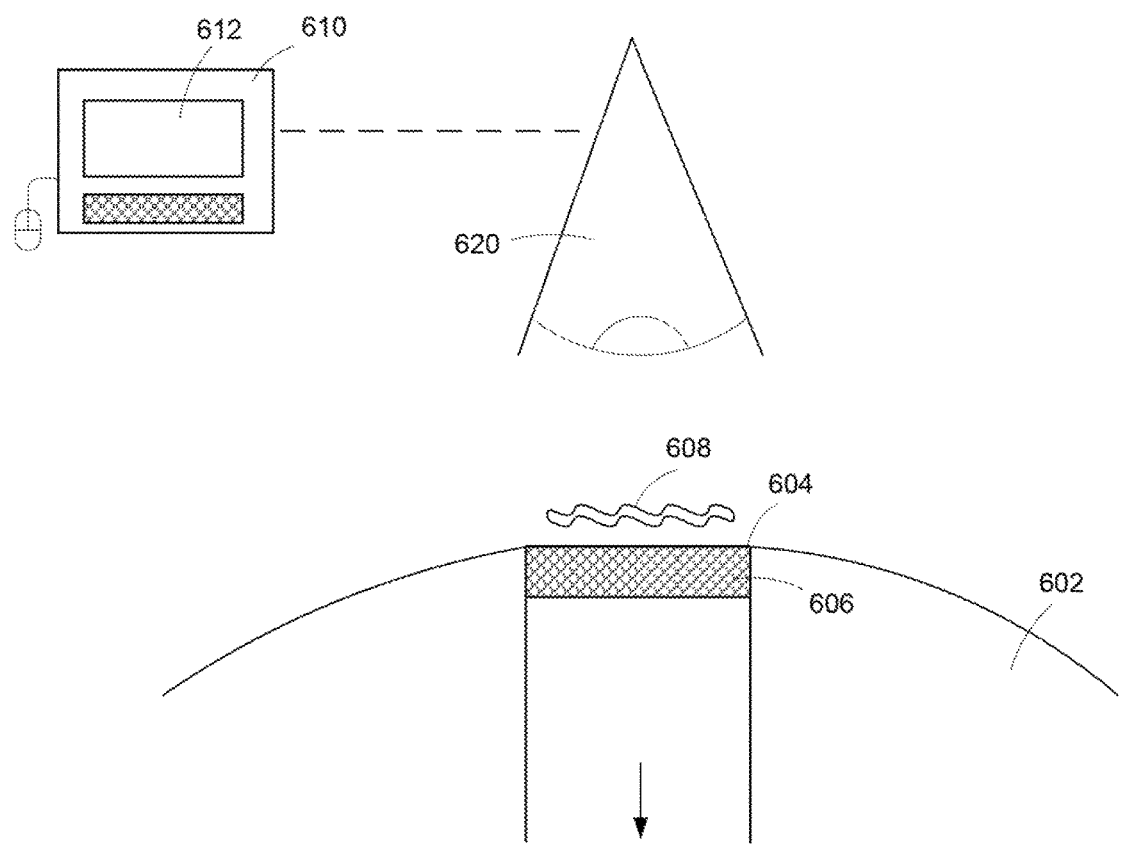
FIG. 6 is a diagram of operation when the tissue collector is at a second position.

FIG. 6 illustrates operation when the stage 602 is at a second position. The stage 602 has rotated so that the aperture 604, barrier 606, and tissue section 608 held at the barrier 606 are positioned at a sufficient distance and angle so that an imager 620 can obtain an image of the tissue section 608 and send it to a controller 610.

Figure 7:
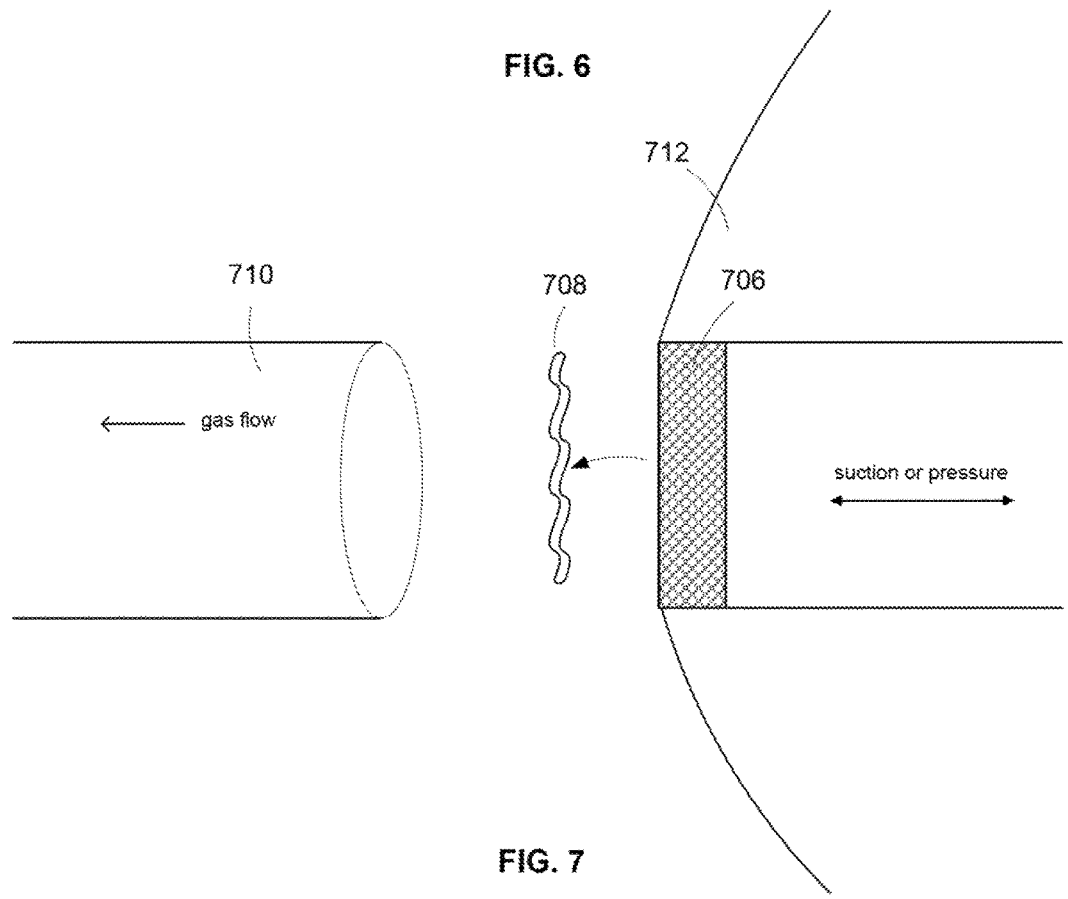
FIG. 7 is a diagram of operation when the tissue collector is at a third position.

FIG. 7 shows an embodiment of operation when the stage 702 is at a third position and a reject collector 710 for rejected tissue sections is present. In FIG. 7, the tissue section 708 is being discarded after a determination at or after the tissue section has been assessed through an interface 712. The tissue section 708 has been released from the barrier 706. If the tissue section is attached to an adhesive strip, both may be discarded. Thus, the present apparatus and methods can comprise a user interface in communication with a controller, wherein the user interface is adapted to display or report on the tissue section at the second position. The user interface can also be adapted to accept instructions for the tissue collector and the reject collector to collect the tissue section from the stage.

Figure 8:
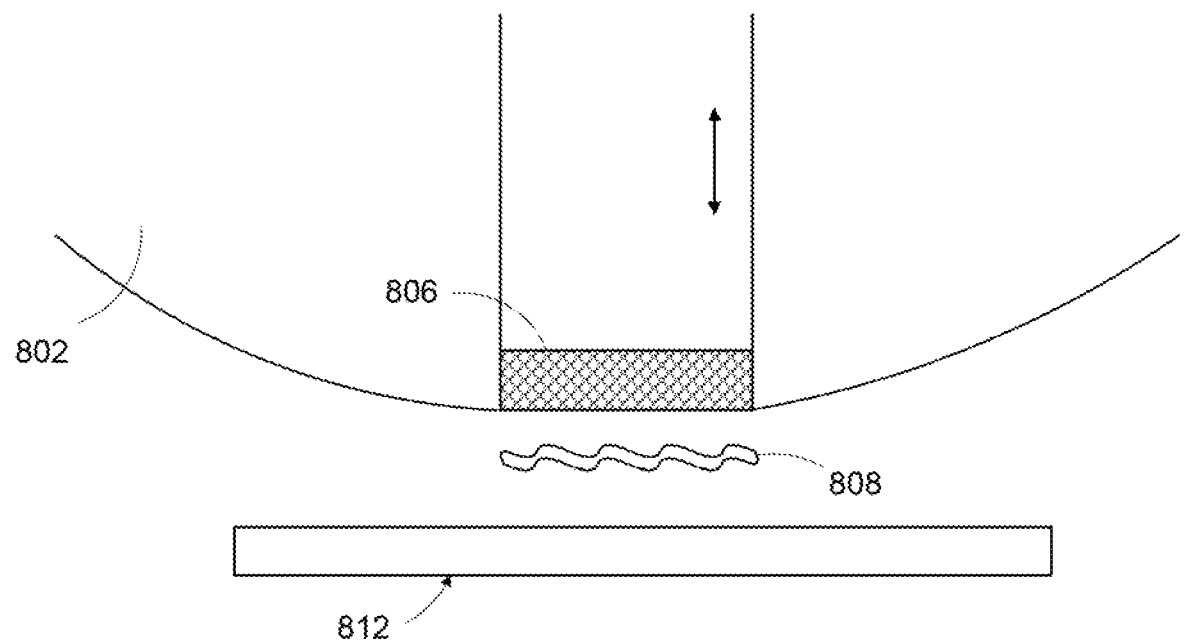
FIG. 8 is a diagram of operation when the tissue collector is at a fourth position.

FIG. 8 shows an embodiment of operation when the stage 802 is at a fourth position and a tissue section 808 is released or propelled off the barrier 806. When the stage reaches the fourth position, the pressure in the interior channel 810 is altered so that the tissue section 808. In certain embodiments, the reduced pressure is halted so that suction no longer holds the tissue section on the barrier 806. Additionally, a positive pressure can be provided to the interior channel 810, so that the tissue section is pushed away from the barrier 806. In FIG. 8, the tissue section 808 is being deposited onto a slide 812. The slide 812 may be manually placed under the fourth position, or it may be on a conveyer that automatically brings the slide 812 to the desired location. The conveyer may be under the control and receive a signal from a controller, such as the controller which receives a signal from the imager.

It is also contemplated that the front plate 116 or other surface on which a tissue section may fall can be provided with small holes connected to a source of positive pressure gas.

EXEMPLARY EMBODIMENTS

Exemplary embodiments provided in accordance with the presently disclosed subject matter include, but are not limited to, the following:

1. An apparatus for slicing a tissue section from a sample, comprising:

a microtome comprising a sample holder adapted for linear motion, a knife holder and a knife held by the knife holder opposite the sample holder, such that when the sample holder is moved linearly, a sample held by the sample holder is sliced by the knife to form a tissue section;

a positive pressure supplier positioned relative to the knife so as to provide a positive pressure gas on and/or below the tissue section sliced by the knife.

2. The apparatus of embodiment 1, wherein the positive pressure supplier comprises a line of holes to provide a line of gas across a tissue section.

3. The apparatus of embodiment 1, wherein the positive pressure supplier comprises at least two outlets which provide gas at different angles with respect to the sample holder.

4. The apparatus of embodiment 3, wherein a first of the outlets is positioned to provide a stream of positive pressure gas at a non-perpendicular angle toward the sample holder.

5. The apparatus of embodiment 4, wherein a second of the outlets is positioned to provide a stream of positive pressure gas substantially parallel to the sample holder.

6. The apparatus of any of embodiments 3 to 5, wherein the first outlet, or the second outlet, or both, is fluidly connected to an in-line ionizer configured to ionize the positive pressure gas supplied to the positive pressure supplier.

7. The apparatus of any of embodiments 1 to 5, wherein the apparatus further comprises one or more ionizers to provide neutralizing ions to the positive pressure gas from the positive pressure supplier.

8. The apparatus of any of embodiments 1 to 7, further comprising a front plate on the knife holder located such that the tissue section sliced by the knife deposits on or at the front plate.

9. The apparatus of embodiment 8, wherein the front plate has one or more apertures configured for passage of a positive pressure gas and/or gas moved by reduced pressure.

10. The apparatus of embodiment 9, wherein the one or more apertures are configured for passage of a positive pressure gas to form a gas layer adapted to support the tissue section.

11. The apparatus of embodiment 8, wherein the front plate defines a flow path for positive pressure gas and having an outlet directed toward a point of contact between the knife and the tissue sample, or at a point of slicing the tissue section from the tissue sample.

12. The apparatus of embodiment 8, wherein the front plate defines a manifold in fluid communication with one or more apertures on a surface of the front plate and/or an outlet directed toward a point of contact between the knife and the tissue sample.

13. The apparatus of any of embodiments 1 to 12, further comprising a second positive pressure supplier configured and positioned to provide positive pressure gas on the tissue section as it is placed into a slide bath and/or as it is removed from a slide bath.

14. The apparatus of any of embodiments 1 to 13, further comprising a control system configured to automate movement and/or operation of the positive pressure supplier.

15. An apparatus for slicing a tissue section from a sample, comprising:
a microtome comprising a sample holder, a knife holder and a knife held by the knife holder opposite the sample holder, such that when the sample holder is moved linearly, a sample held by the sample holder is sliced by the knife to form a tissue section;
a tissue collector capable of rotational motion, linear motion, or both, wherein the tissue collector has an end adapted for collecting the tissue section;
wherein the tissue collector is adapted for movement to a position where a collecting end of the tissue collector is in contact with or in sufficient proximity to the tissue section such that the tissue is collected by the tissue collector.

16. The apparatus of embodiment 15, wherein the collecting end of the tissue collector has one or more apertures adapted for providing suction.

17. The apparatus of embodiment 15, wherein the collecting end of the tissue collector has an adhesive strip.

18. The apparatus of any of embodiments 15 to 17, wherein the collecting end of the tissue collector is extendible.

19. The apparatus of any of embodiments 15 to 18, further comprising a slide holder.

20. The apparatus of embodiment 19, wherein the slide holder is adapted for automated movement.

21. An apparatus for collecting a tissue section from a knife and transferring the tissue section, comprising:
an automated tissue collector adapted for movement in relation to the knife, such that the tissue collector can contact the tissue section after slicing;
a pneumatic source capable of providing positive pressure, reduced pressure, or both to said apertures; and
one or more interior channels, wherein the interior channels fluidly connect said apertures to the pneumatic source.

22. The apparatus of embodiment 21, wherein the automated tissue collector is attached to a rotating support whose rotation changes position of the automated tissue collector.

23. The apparatus of embodiment 22, wherein the rotating support is connected to a controller.

24. The apparatus of embodiment 21, further comprising a control system configured to automate movement and/or operation of the tissue collector.

25. The apparatus of embodiment 22, wherein the tissue collector is adapted for rotation to two or more positions.

26. The apparatus of any of embodiments 22 to 25, further comprising an imager proximate to the collecting end of the tissue collector at one of the positions of the tissue collector.

27. The apparatus of any of embodiments 22 to 26, wherein the tissue collector comprises one or more apertures fluidly connected to a pneumatic source, and a gas-permeable, tissue-impermeable barrier covering each of said one or more apertures.

28. The apparatus of any of embodiments 22 to 27, wherein the apparatus further comprises a reject collector near the tissue collector at one of the positions.

29. The apparatus of embodiment 28, further comprising a vacuum source in fluid communication with the reject collector.

30. The apparatus of any of embodiments 22 to 29, wherein the apparatus further comprises a slide holder near the tissue collector at one of the positions.

31. The apparatus of embodiment 30, wherein the tissue collector releases the tissue section by application of positive pressure at or near the slide holder.

32. The apparatus of embodiment 30, wherein the tissue collector releases by halting reduced pressure at or near the slide holder.

33. The apparatus of any of embodiments 22 to 32, wherein the exterior surface of the tissue collector is flat, cylindrical, octagonal, or another shape.

34. The apparatus of any of embodiments 22 to 33, further comprising a controller in communication with the tissue collector, the imager, and the reject collector, wherein the controller is adapted to receive a signal from the imager and to send a signal to the stage and a signal to the reject collector.

35. The apparatus of embodiment 34, further comprising a user interface in communication with the controller, wherein the user interface is adapted to display or report on the tissue section at the second position, and to accept instructions for the tissue collector and the reject collector to collect the tissue section from the stage.

36. The apparatus of any of embodiments 22 to 35, wherein the tissue collector has at least two apertures.

37. The apparatus of any of embodiments 22 to 36, further comprising a tissue knife that is movable relative to the tissue collector, such that the tissue knife is adapted for movement to slice a tissue section from a sample, and then to contact or be in close proximity to the aperture of the stage when the aperture is in a first position.

38. The apparatus of any of embodiments 22 to 37, further comprising a positive pressure supplier near the tissue knife, positioned to provide a positive pressure gas on or below the tissue section sliced by the tissue knife.

39. The apparatus of embodiment 38, wherein the positive pressure supplier is configured and positioned to provide a line of gas across a tissue section.

40. The apparatus of embodiment 38, wherein the positive pressure supplier is positioned and configured to provide positive pressure gas on a tissue-facing surface of a knife pressure plate of a microtome.

41. The apparatus of embodiment 40, wherein the knife pressure plate has openings through which positive pressure gas passes from the inside surface to the outside surface of the knife pressure plate, thereby preventing the tissue section from sticking to the knife pressure plate.

42. An apparatus for slicing a tissue section from a sample, comprising:
a microtome comprising a sample holder adapted for linear motion, a knife holder and a knife held by the knife holder opposite the sample holder, such that when the sample holder is moved linearly, a sample held by the sample holder is sliced by the knife to form a tissue section, and a front plate on the knife holder located such that the tissue section sliced by the knife deposits on or at the front plate;
a first positive pressure supplier positioned relative to the knife so as to provide a positive pressure gas on and/or below the sample holder;
one or more ionizers to provide neutralizing ions toward the sample holder and/or the front plate;
a tissue collector capable of rotational motion, linear motion, or both to a plurality of positions, wherein the tissue collector has an end adapted for collecting the tissue section;
a slide bath adapted for holding a liquid;
a slide holder near one of the positions of the tissue collector and capable of motion to submerge a held slide into the slide bath;
a second positive pressure supplier configured and positioned to provide positive pressure gas on the tissue section as it is placed into a slide bath and/or as it is removed from a slide bath.

43. The apparatus of embodiment 42, wherein the tissue collector is configured for collecting the tissue section by suction, adhesive, friction, or other force.

44. The apparatus of embodiment 42, wherein the tissue collector is configured for collecting the tissue section by an adhesive material.

45. The apparatus of any of embodiments 42 to 44, further comprising an imager proximate to the collecting end of the tissue collector at one of the positions of the tissue collector.

46. The apparatus of any of embodiments 42 to 44, further comprising a controller in communication with the tissue collector, wherein the controller is adapted to send a signal to the tissue collector to control a motion of the tissue collector.

47. The apparatus of embodiment 46, wherein the controller is in communication with an imager, and the controller is configured to assess the quality of the tissue section.

48. The apparatus of embodiment 47, wherein the controller is configured to send a signal to the tissue collector to accept or reject the tissue section based on the assess quality of the issue section.

49. The apparatus of embodiment or 58, wherein the tissue collector is configured to transfer the tissue section by application of positive pressure at or near the slide holder.

50. The apparatus of any of embodiments 42 to 49, wherein the tissue collector is a rotatable stage, wherein the rotatable stage has one or more apertures on an exterior surface, and a gas-permeable, tissue-impermeable barrier covering each of said one or more apertures.

51. A method of collecting and transferring a tissue section sliced from a tissue block, the method comprising:
collecting a tissue section sliced from a tissue sample onto a tissue collector while the tissue collector is at a first position, wherein the tissue collector is adapted for rotational motion, linear motion, or both;
moving the tissue collector to at least one other position for processing the tissue section.

52. The method of embodiment 51, wherein the tissue collector collects the tissue section by suction, adhesive, friction, or other force.

53. The method of embodiment 51, wherein the tissue collector collects the tissue section by an adhesive material.

54. The method of any of embodiments 51 to 53, further comprising imaging the tissue section at one of the positions of the tissue collector.

55. The method of any of embodiments 51 to 54, further comprising determining whether to reject the tissue section or to accept it for analysis.

56. The method of embodiment 55, further comprising discarding the tissue section if its quality is assessed to be insufficient, unsuitable or unwanted.

57. The method of embodiment 55, further comprising transferring the tissue section to a slide if it is determined to be acceptable for analysis.

58. The method of any of embodiments 51 to 56, further comprising transferring the tissue section to a slide.

59. The method of embodiment 57 or 58, wherein the tissue collector transfers the tissue section by application of positive pressure at or near the slide holder.

60. The method of embodiment 57 or 58, wherein the tissue collector transfers by halting reduced pressure at or near the slide holder.

61. The method of embodiment 57 or 58, wherein the tissue section is transferred to the slide without manual contact with the tissue section.

62. The method of embodiment 57 or 58, wherein the tissue section is transferred to the slide by contacting an adhesive material having the tissue section with the slide.

63. The method of any of embodiments 51 to 62, wherein the method comprising extending the tissue collector or a portion thereof so that a collecting end contacts the tissue section.

64. The method of any of embodiments 51 to 63, wherein the tissue collector collects the tissue section from a microtome without manual contact with the tissue section.

65. The method of any of embodiments 51 to 64, comprising attaching an adhesive material to a collecting end of the tissue collector.

66. The method of any of embodiments 51 to 65, wherein the tissue collector is a rotatable stage using reduced pressure while the stage is at a first position, wherein the rotatable stage has one or more apertures on an exterior surface, and a gas-permeable, tissue-impermeable barrier covering each of said one or more apertures.

67. The method of embodiment 66, wherein the tissue collector moves to a second position while holding the tissue section, and the tissue section held on the stage is imaged at the second position.

68. The method of embodiment 51 to 67, further comprising receive a signal from an imager and send a signal to the tissue collector.

69. The method of embodiment 66 or 67, wherein the tissue collector rotates to a third position where the tissue section is retained or released.

70. The method of embodiment 69, wherein the tissue section is released by interrupting the reduced pressure at the aperture, or applying positive pressure at the aperture, or both.

71. The method of embodiment 69, wherein the tissue section is assessed at or after the second position, and the tissue section is released or retained at the third position based on the assessment.

72. The method of embodiment 69, wherein the tissue collector rotates to a fourth position where the tissue section is released from the stage.

73. The method of embodiment 72, wherein the tissue section is released by interrupting the reduced pressure at the aperture, or applying positive pressure at the aperture, or both.

74. The method of embodiment 72 or 73, wherein the tissue section is deposited onto a slide when it is released.

75. The method of embodiment 66, wherein the tissue section is a first tissue section, and the method further comprise the step of collecting a second tissue section onto the rotatable stage before releasing the first section onto the slide.

76. The method of embodiment 75, further comprising the step of slicing the tissue section from a tissue block before the tissue section is collected by the stage.

77. The method of embodiment 75, wherein the tissue section is sliced from the tissue block such that a trailing end of the tissue section is adhered to the tissue knife; and the method further comprises moving the tissue knife toward the rotatable stage to bring the tissue section closer to the stage.

78. The method of embodiment 75, further comprising the step of applying a positive pressure gas on the tissue section during or after the slicing of the tissue section.

79. The method of embodiment 78, wherein the positive pressure is sufficient to prevent the tissue section from bunching, curling, or sticking to a tissue knife or a surface of a microtome.

80. An automated method for slicing a tissue section from a sample, comprising:
   slicing a tissue sample from a tissue sample with a knife by moving the sample over the knife; and
   applying a positive pressure gas to one or both sides of the tissue section during the slicing.

81. The automated method of embodiment 80, wherein the positive pressure gas is applied to a front side of the tissue section at a non-perpendicular angle.

82. The automated method of embodiment 81, wherein the positive pressure gas is applied to the tissue section when the tissue sample initially contacts the knife for slicing.

83. The automated method of any of embodiments 80 to 82, further comprising directing neutralizing ions toward the tissue section during slicing from the tissue sample.

84. The automated method of embodiment 83, wherein neutralizing ions are directed toward a front plate before the tissue section is completely sliced from the tissue sample.

85. The automated method of any of embodiments 80 to 84, further comprising adhering the tissue section to a tissue collector using an adhesive, reduced pressure, friction, or other force; wherein the tissue collector is adapted for linear motion and rotational motion, or both.

86. The automated method of any of embodiments 80 to 85, further comprising moving the tissue collector and the adhered tissue section away from the knife and submerging the tissue section in a liquid.

87. The automated method of embodiment 86, wherein a positive pressure gas is applied to the tissue section as it is placed into the liquid and/or as it is removed from the liquid.

88. The automated method of any of embodiment 80 to 87, wherein the tissue collector has an adhesive material on a surface adapted to contact a portion of the tissue section and to contact a portion of a slide.

89. The automated method of any of embodiment 80 to 88, further comprising transferring the tissue section to a slide.

90. An automated method for slicing a tissue section from a sample, comprising:
   slicing a tissue sample from a tissue sample with a knife by moving the sample over the knife;
   applying a positive pressure gas to a front side of the tissue section at a non-perpendicular angle during the slicing;
   directing neutralizing ions toward the tissue section during slicing from the tissue sample and toward a front plate before the tissue section is completely sliced from the tissue sample;
   applying a positive pressure gas and/or neutralizing ions at a front plate before the tissue section is completely sliced from the tissue sample, wherein the front plate is positioned relative to the knife so that the tissue section lies on the front plate after the slicing;
   extending an automated tissue collector so as to collect the tissue section from the front plate;
   adhering the sliced tissue section to the tissue collector using an adhesive, reduced pressure, friction, or other force;
   moving the tissue collector so that it is in a position to transfer the tissue section to a slide; and
   transferring the adhered tissue section to a slide held by a slide holder;
   moving the slide holder and the adhered tissue section to a slide bath containing a liquid;
   submerging the slide and the adhered tissue section in a liquid; and
   applying positive pressure gas to the adhered tissue section as it is placed into the liquid and/or as it is removed from the liquid.

The foregoing description of exemplary or preferred embodiments should be taken as illustrating, rather than as limiting the present invention as defined by the embodiments. As will be readily appreciated, numerous variations and combinations of the features set forth above can be utilized without departing from the present invention as set forth in the embodiments. Such variations are not regarded as a departure from the scope of the invention, and all such variations are intended to be included within the scope of the following embodiments. All references cited herein are incorporated by reference in their entireties.

We claim:

1. An apparatus for slicing a tissue section from a sample, comprising:
   a microtome comprising a sample holder adapted for linear motion, a knife holder and a knife held by the knife holder opposite the sample holder, such that when the sample holder is moved linearly, a sample held by the sample holder is sliced by the knife to form a tissue section;
   a pneumatic source positioned so as to provide pulsed gas flow across the tissue section to be sliced by the knife from a tissue sample wherein said pulsed gas flow reduces or prevents deformation of the tissue section as the tissue section is cut, wherein said pulsed gas flow begins approximately simultaneously when the tissue sample initially contacts the knife for slicing; and
   a tissue collector adapted to collect the tissue section at its trailing edge.

2. The apparatus of claim 1, wherein the pneumatic source comprises a line of holes to provide a line of gas across a tissue section.

3. The apparatus of claim 1, wherein the pneumatic source comprises at least two outlets which provide gas at different angles with respect to the sample holder.

4. The apparatus of claim 3, wherein a first of the outlets is positioned to provide a stream of positive pressure gas at a non-perpendicular angle toward the sample holder.

5. The apparatus of claim 4, wherein a second of the outlets is positioned to provide a stream of positive pressure gas substantially parallel to the sample holder.

6. The apparatus of claim 3, wherein the first outlet, or the second outlet, or both, is fluidly connected to an in-line ionizer configured to ionize the gas provided to the pneumatic source.

7. The apparatus of claim 1, wherein the apparatus further comprises one or more ionizers to provide neutralizing ions to the gas provided to the pneumatic source.

8. The apparatus of claim 1, further comprising a control system configured to automate movement and/or operation of the pneumatic source.

9. The apparatus of claim 1, wherein the tissue collector comprises a collecting end comprising one or more apertures adapted for providing suction.

10. The apparatus of claim 1, wherein the tissue collector comprises an extendible collecting end.

11. The apparatus of claim 1, further comprising a slide holder.

12. The apparatus of claim 11, wherein the slide holder is adapted for automated movement.

13. The apparatus of claim 1, wherein the pneumatic source is a reduced pressure source.

14. The apparatus of claim 1, wherein the tissue collector comprises an adhesive strip end and is adapted for movement to a position where the adhesive strip is in contact with a portion of the tissue section such that the tissue is collected by the tissue collector.

15. The apparatus of claim 1, wherein the tissue collector is capable of rotational motion, linear motion, or both, and wherein the tissue collector has an end adapted for collecting the tissue section.

16. The apparatus of claim 15, wherein the end of the tissue collector has an adhesive strip or one or more apertures adapted for providing suction.

17. The apparatus of claim 15, wherein the tissue collector is adapted for movement to a position where a collecting end of the tissue collector is in contact with or in sufficient proximity to the tissue section such that the tissue is collected by the tissue collector.

* * * * *